Patented Sept. 12, 1944

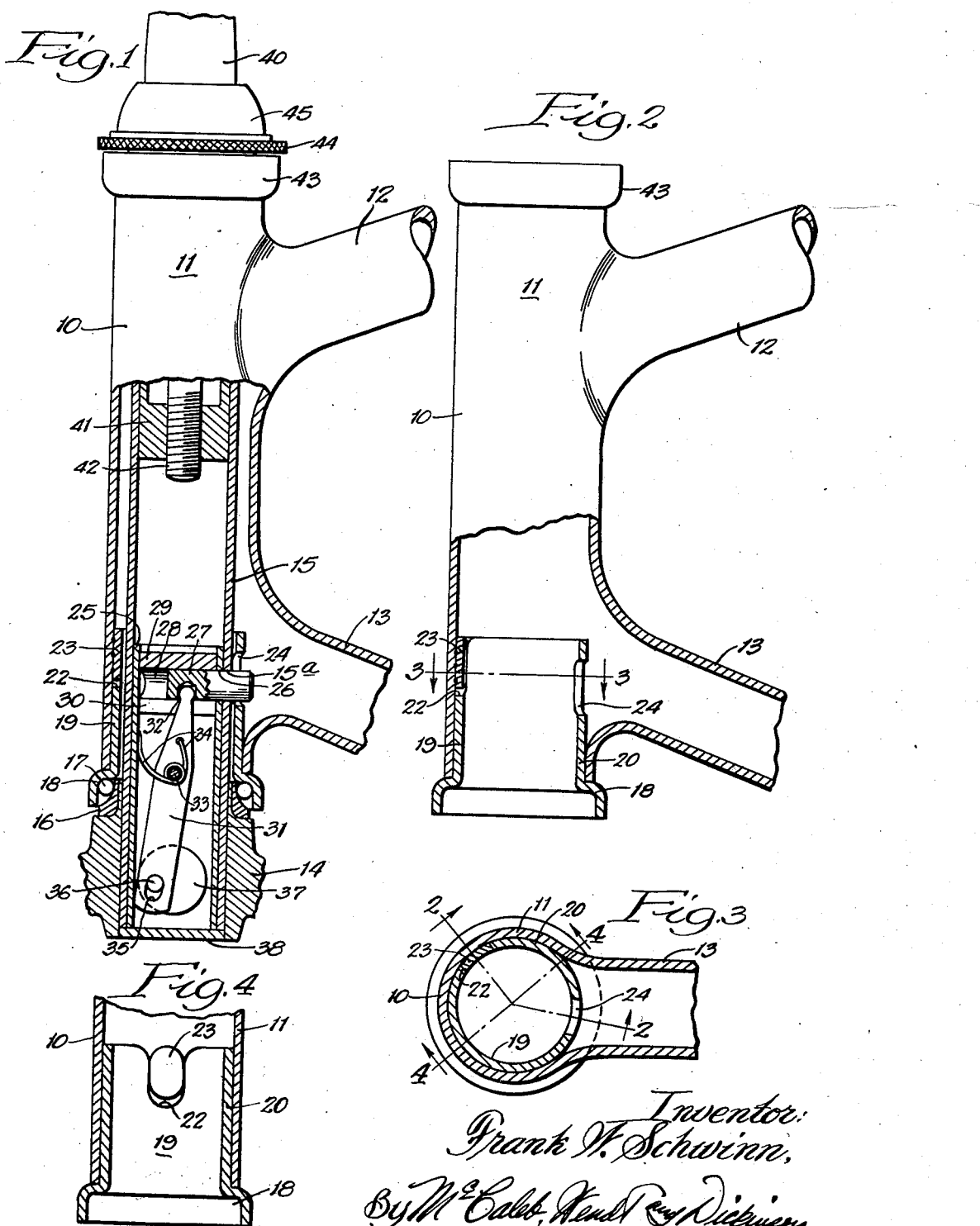

2,358,035

UNITED STATES PATENT OFFICE 2,358,035

BICYCLE FRAME HEAD AND CUP

Frank W. Schwinn, Chicago, Ill.

Application September 10, 1941, Serial No. 410,231

9 Claims. (Cl. 280—279)

My invention relates to a bicycle frame head and cup, and is particularly concerned with a head cup mounting adapted for use with a steering locked bicycle.

A number of locking arrangements for bicycles have been developed, many of which have for their basic concept the locking of the front wheel fork against pivotal steering movement. Such a lock acts between the pivoted front wheel fork and the frame, and preferably should be concealed to avoid tampering.

While with a non-steering-locked bicycle an ordinary press or drive fit of the head cup in the tubular head frame is sufficient to withstand all torsional stresses to which it is apt to be subjected, such mounting of the head cup is entirely inadequate for use where the locking stresses are to be transmitted to and carried by the head cup.

Among the features and objects of my invention are the following:

To conceal a locking arrangement for a steering-locked bicycle by means of a special arrangement of head cup and head cup mounting.

To mount the head cup of a bicycle with concealed torque resisting features.

To fasten a concealed anchor member within the steering head of a bicycle frame and to arrange a head cup for torque resisting engagement therewith.

To arrange the head cup of a bicycle so that the cup is locked against torque stresses, but is not locked positively against slidable endwise removal.

A further object of my invention is to arrange a torque locked head cup with a lock receiving opening disposed to register with the interior of a tubular frame member jointed to a head frame within which the head cup is mounted, to free a lock member for passage through the opening in the head cup wall, and into the tubular frame member within which it is concealed and protected.

These and other objects and advantages of my invention will be apparent from the following description and the accompanying drawing.

Referring to the drawing, of which there is one sheet:

Fig. 1 is a fragmentary view partly in vertical longitudinal section and partly in side elevation, showing the head frame of a bicycle with interconnected tubular frame members, and with a steering fork and steering fork stem mounted therein, a steering locking mechanism being illustrated as mounted within the steering fork stem, and a locking member illustrated as in projected, locking engagement with a head cup embodying the present invention;

Fig. 2 is a view, taken on the plane of the line 2—2 of Fig. 3, similar to Fig. 1, but with the wheel fork and associated parts removed, showing merely the head frame and head cup;

Fig. 3 is a transverse section taken on the plane of the line 3—3 of Fig. 2; and Fig. 4 is a vertical section taken on the plane of the line 4—4 of Fig. 3.

Referring to the drawing in detail:

A bicycle frame 10 has a tubular frame head member 11 and co-planar tubular frame members 12 and 13 secured thereto as by welding.

A front wheel fork 14 is provided with a tubular stem 15 which passes through the frame head 11, and is pivoted therein for steering movement. A lock-bolt opening 15a is provided in the wall of the fork stem 15, the purpose of which will be brought out later in the specification.

A ball bearing cone member 16 is mounted on the fork 14 and engages a row of bearing balls 17 which are mounted in a raceway 18 in a head cup 19. The head cup has a tubular shank 20 adapted to have a tight pressed or drive fit within the frame head 11, the raceway 18 being provided by an enlarged offset cup portion, formed at the lower end of the sleeve. The interior raceway for the bearing balls preferably is finished by grinding.

A lock-receiving opening 24 is provided, as by punching, in the wall of the tubular shank 20 to register with the opening into the interior of the tubular frame member 13. The slug punched from the opening preferably is used as an anchor to secure the cup against turning movement under torque stresses to which it is subjected in use. A notch 22 is provided in the end of the tubular shank of the head cup, and is adapted to have a slidable fit over the slug 23 which is secured, as by spot welding, to the inner face of the frame head 11. The position of the slug circularly of the frame head is not material to the invention, and may be determined by the manufacturing facilities available for securing the slug in place. Any change in the location of the slug, will however, require a corresponding change in the location of the notch 22 to bring the opening 24 into registry with the tube 13.

The lock mechanism illustrated includes a lock retaining sleeve 25 closely fitted into the fork stem and having an opening 26 therein registering with the opening 15a of the fork stem, and adapted additionally to register with the opening 24 of the cup. As herein illustrated, the opening 15a is so located radially of the fork stem that the wheel fork 14 must be turned through an angle of approximately 90 degrees from a straight-ahead position to bring the openings into locking registry with each other.

A lock-bolt 27 is mounted slidably in a cylindrical recess 28 in a head block 29 secured within the lock-sleeve 25, a slotted way 30 opening from the bottom of the head block into the recess 28 to free the upper end of a bolt actuating lever 31 for slidable movement therein. A recess 32 is provided in the lower side of the bolt to receive the rounded head of the lever 31, the lever being pivoted on a pin 33 secured transversely of the sleeve. A spring 34 is coiled around the pin, and is held in torsion between the sleeve wall and the lever to urge the bolt toward a locked position.

A slotted opening 35 is provided in the lower end of the lever to receive a pin 36 mounted eccentrically of a locking cylinder 37 which is pivotally mounted in the steering fork 14. The slotted opening 35 is illustrated as of a length to free the pin through the lower half only of the turning cycle of the cylinder, and to prevent its rotation through the upper half of the cycle. This limits the turning movement of the cylinder to 180 degrees in either direction, which is desirable in the arrangement illustrated.

Suitable key or combination operated locking means may be associated with the cylinder 37 as required.

A closure plate 38 is provided across the lower end of the fork stem to seal it against the entrance of dust and moisture.

A handle bar stem 40 is inserted in the upper end of the tubular fork stem 15, and is secured in adjusted position therein by means of a stem-nut 41 and stem-bolt 42. An upper head cup 43 is mounted in the upper end of the frame head 11, and is provided with a customary ball bearing, not illustrated. An adjustable cone member 44 and lock-nut 45 are threaded onto the upper end of the stem 15.

My improved head cup is easily and economically manufactured, and may be used as standard construction on all bicycle frames, so as to adapt them for steering-locking by installation of the lock as an accessory after purchase, even though not originally equipped with such locking mechanism.

The slug 23 secured to the inner wall of the frame head 11, being the punching from the opening 24 in the stem 14, is curved to fit properly the inner wall of the frame head 11 without subsequent forming. This arrangement reduces to a negligible amount the additional expense involved in practicing my invention.

No change is required in the manufacturing setup or assembly operations for employing my new torque anchored head cup as compared with the old style plain shank head cup with the exception of the provision for punching the opening 24, and the notch 22 and securing the slug 23 in position on the inner side of the frame head 11.

In case of excess wear or damage to the head cup, it may be removed on an arbor press, or by means of a cup-puller, and replaced with a new one as easily and simply as in the case of the old style cups.

While I have illustrated a preferred embodiment of my invention, it may be modified without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A head cup for a bicycle frame having a tubular frame head and jointed co-planar frame members, the frame head having an inwardly offset portion carried thereby and having an opening from the head frame into one of the co-planar tube members, said head cup comprising a skirt portion adapted to extend at least partially over the opening from the frame head into the co-planar frame member and having a radial opening arranged to register with said frame member opening for projection of a lock bolt from the interior of the head cup therethrough to the interior of the frame member, said head cup having an edge portion disposed longitudinally thereof and adapted to engage the offset portion of the frame head to anchor the shank against turning movement, the head cup being capable of endwise withdrawal from the head frame.

2. A head cup for a bicycle frame having a tubular frame head and jointed co-planar frame members, the frame head having an inwardly offset portion carried thereby and having an opening from the head frame into one of the tubular members, said head cup comprising a skirt portion adapted to extend at least partially over the opening from the frame head into the frame member, said head cup having an opening adapted to register with the opening from the frame head into the frame member to enable a locking bolt to be received therethrough and within said frame member, said head cup having an edge portion disposed longitudinally thereof and adapted to engage the offset portion of the frame head to anchor the shank against turning movement.

3. A head cup for a steering-locked bicycle having a tubular frame head and interconnected tubular frame members, a radially offset wall portion carried by the frame head, a wheel fork having a tubular stem pivotally supported in the frame head, and a lock member projectable radially through the wheel fork stem, said head cup having a tubular skirt portion adapted to be inserted in the frame head, said head cup having an edge portion adapted to engage the offset wall portion of the frame head on such telescopic insertion to anchor the head cup against turning movement, said skirt portion having an opening therein adapted to receive the lock member to lock the fork stem to the cup to prevent steering movement.

4. A head cup for a steering-locked bicycle having a tubular frame head and interconnecting tubular frame members in open communication therewith, a radially offset wall portion carried by the frame head, a wheel fork having a tubular stem pivotally supported by the frame head, and a lock member projectable radially beyond the wheel fork stem, said head cup having a tubular skirt portion adapted to be inserted in the frame head, said head cup having an edge portion adapted to engage the offset wall portion of the frame head on slidable insertion of the tubular skirt portion to anchor the head cup against turning movement, said skirt portion having an opening adapted to register with the opening from the frame head into one of the frame members to admit the lock member to the interior of such frame member, thereby to lock the fork stem to the cup to prevent steering movement.

5. A radially anchored head cup for steering-locked bicycles comprising in combination with a bicycle frame having a tubular frame head and interconnected tubular frame members, a head cup having a tubular skirt portion adapted to fit closely within the frame head, an enlarged bearing race formed in an end of the bearing cup to seat against the end of the frame head to limit the insertion of the bearing cup, the skirt of said head cup having an opening punched in a side wall thereof and having a notch in an end thereof, the slug from the opening being secured to the inner wall of the frame head and adapted to enter the notch to anchor the cup against turning movement.

6. A radially anchored head cup for steering-locked bicycles comprising in combination with a bicycle frame having a tubular frame head and interconnected tubular frame members, one of said tubular frame members being in open communication with the interior of the frame head, a head cup having a tubular skirt portion adapted to fit closely within the frame head, an enlarged bearing race formed in an end of the bearing cup to seat against the end of the frame head to limit insertion of the bearing cup, the skirt of said head cup having an opening punched in a side wall thereof and having a notch in the end thereof, the slug punched from said opening being secured to the inner wall of the frame head, and adapted to enter the notch to anchor the cup against turning movement, the opening in the skirt being located to register with the opening from the frame head into the interior of the frame member to receive a lock member.

7. The method of locking a head cup to a bicycle tubular frame head, which comprises punching a slug from the cup wall, forming a notch in the cup end adapted to receive the slug, securing the slug to the inner wall of the frame head, and introducing the cup into the frame head to bring the slug into the notch.

8. In a bicycle frame structure, the combination of a tubular frame head for receiving the steering column of a front fork, a head cup member having a tubular portion adapted to extend into said tubular frame member and to have a frictional fit therein, said head cup member having an outwardly and radially extending flange for engaging the end of said tubular frame member and having the inner surface of said flange formed with a ball bearing race, the said tubular portion being formed with oppositely extending shoulders for preventing the rotation of said head cup member in said frame member, and a curved metal stop member having substantially the same curvature as the tubular portion of said head cup member, secured to the inner wall of said tubular frame member in position to engage said shoulders, whereby the head cup member is positively locked against rotation, a tubular steering column mounted in said tubular frame member for rotation and having a lock body in said column, a locking bolt adapted to be projected into a bolt recess in said tubular portion, and key-actuated means for controlling said locking bolt.

9. In a bicycle frame structure, the combination of a tubular frame head for receiving the steering column of a front fork, a head cup member having a tubular portion adapted to extend into said tubular frame member and to have a frictional fit therein, said head cup member having an outwardly and radially extending flange for engaging the end of said tubular frame member, the said tubular portion being formed with oppositely extending shoulders for preventing the rotation of said head cup member in said frame member, and a curved metal stop member having substantially the same curvature as the tubular portion of said head cup member, secured to the inner wall of said tubular frame member in position to engage said shoulders, whereby the head cup member is positively locked against rotation, a tubular steering column mounted in said tubular frame member for rotation and having a lock body in said column, a locking bolt adapted to be projected into a bolt recess in said tubular portion, and key-actuated means for controlling said locking bolt.

FRANK W. SCHWINN.